United States Patent [19]

Gale et al.

[11] Patent Number: 4,819,597
[45] Date of Patent: Apr. 11, 1989

[54] CLOCKED CURRENT TORQUE MOTOR CONTROL

[75] Inventors: Allan R. Gale, Allen Park; James M. Slicker, Union Lake, both of Mich.

[73] Assignee: Eaton Corporation, Cleveland, Ohio

[21] Appl. No.: 177,714

[22] Filed: Apr. 5, 1988

[51] Int. Cl.$^4$ .......................... G05B 11/28; P02D 9/00
[52] U.S. Cl. ..................................... 123/399; 123/361; 318/599
[58] Field of Search ...................... 123/399, 361, 403; 318/599, 341, 606

[56] References Cited

U.S. PATENT DOCUMENTS

| | | | |
|---|---|---|---|
| 3,700,996 | 10/1972 | Gutting | 123/361 |
| 4,066,945 | 1/1978 | Korte, Jr. | 318/599 |
| 4,072,883 | 2/1978 | Beider | 318/599 |
| 4,105,939 | 8/1978 | Culbertson | 318/599 |
| 4,188,926 | 2/1980 | Fleischer | 123/361 |
| 4,306,181 | 12/1981 | Welburn | 318/599 |
| 4,546,736 | 10/1985 | Moriya et al. | 123/399 |
| 4,599,548 | 7/1986 | Schultz | 318/599 |
| 4,623,827 | 11/1986 | Ito | 318/599 |

Primary Examiner—Raymond A. Nelli
Attorney, Agent, or Firm—J. G. Lewis

[57] ABSTRACT

A torque motor and throttle body are integrated within a single assembly for application with an internal combustion engine charge air inlet. The butterfly valving element of the throttle body and rotor of the motor are mounted on a common shaft, the position of which is established by a fly-by-wire control circuit. The control circuit includes a driver which selectively energizes the motor in response to the simultaneous receipt of both duty cycle and pulse with information. The control circuit further provides redundant outputs and transducers to enhance system failsafing.

16 Claims, 7 Drawing Sheets

CLOCKED CURRENT TORQUE MOTOR CONTROL

INTRODUCTION

The present invention relates to a circuit for controlling an electrical load with extreme precision and reliability. Particularly, the present invention relates to the control of a torque motor employed in controlling the opening degree of a throttle valve of an internal combustion engine for a motor vehicle.

CROSS REFERENCE

The subject matter of this invention is related to that of U.S. patent application No. 07/175,969 filed on Mar. 31, 1988, identified as Attorney Docket No. 87rCON170 entitled "Method and Apparatus for Positioning a Torque Motor Armature" by L. Uthoff and R. Mohan.

BACKGROUND OF THE INVENTION

In order to meter the amount of air to an internal combustion engine, a variable positionable throttle valve is situated within the induction passage of the engine. Historically, a mechanical link mechanism is provided to couple the throttle valve to an accelerator pedal in a manner to move the throttle valve in response to movement of the accelerator pedal. More recently, so called "fly-by-wire systems" have been proposed which totally eliminate mechanical linkage between the operator's accelerator pedal and the engine throttle valve, providing, in its place, a torque motor which operates to position a throttle valve shaft in response to an electrical operator demand signal. The torque motor is part of an electrical servo control system including potentiometers which convert the movement of the accelerator pedal and throttle valve into corresponding electric signals which are electrically processed to drive the torque motor and thereby move the throttle valve to a position corresponding to a new position of the accelerator pedal. Such servo control systems permit ready modification of the systems response characteristics. For example, the host vehicle operator's perceived "feel" could be altered as a function of engine speed or other input variables. Furthermore, a characteristic could be further modified by other performance or safety related override functions.

Such arrangements typically employ a motor and throttle valve as separate elements, wherein an output shaft of the motor is connected to a throttle valve through a coupling, and wherein the degree of opening of the throttle valve is modulated in accordance with rotational displacement of the output shaft of the motor. Such arrangements have not received wide commercial acceptance, however. The provision of structure between the motor and throttle body tends to proliferate part count and unit cost as well as requires a large space in the engine compartment of the host vehicle. Additionally, the use of separate motor/throttle valve structures raise the possibility of certain failure modes in which torque transmission from the output shaft fails to appropriately position the throttle valve shaft such as through binding and the like.

The application of such devices as a prime throttle control for internal combustion engine of an automobile requires a high degree of reliability and responsiveness to varying operator and system input signals. Accordingly, the motor must be sized to provide extremely fast response to input signal changes over a sustained period of time and in an extremely hostile environment including large temperature gradients, contamination and corrosive atmosphere. Although the motor must have substantial electromagnetic "muscle" to provide appropriate response time, the rotating element's mass must be held to a minimum to prevent inertial induced overshoot requiring damping or other response degrading add-ons to the design. The requirement for reliability also extends to the design of the control circuit which, in addition to providing suitable operating characteristics, must be able to identify and distinguish component failures/anomalies from a validly demanded response.

It will be apparent from a reading of the specification that the present invention may be advantageously utilized with various types of electrical loads for many different applications. However, the invention is especially useful when used in combination with a throttle body for controlling the air inlet passage to an internal combustion engine, and will be described in connection therewith.

BRIEF DESCRIPTION OF THE INVENTION

The present invention is embodied in a system for providing throttle control for an internal combustion engine and overcomes the shortcomings of the prior art described hereinabove. In the broadest sense, a control circuit for selectively energizing the load includes means receiving a pwm demand signal and generating an input signal as a time averaged function thereof which is received as an input by first comparator means which generates an error signal as the function of the difference between the input signal and a sensed load condition signal. A second comparator means operates to generate a switch logic signal as a function of the difference between the error signal and sensed load current. Switch means are provided operative to selectively energize the load in response to a switch command signal from gating means. The gating means, in turn, outputs the switch command signal in response to receiving both the pwm and switch logic signals. This arrangement has the advantage of increasing the reliability of the control circuit and its host system by requiring both duty cycle and pulse width information to be simultaneously received before the load can be energized.

According to the preferred embodiment of the invention, a throttle control device for an internal combustion engine includes a valving element disposed for rotational displacement about and axis within an air intake passage to effect modulation of charge air flowing therethrough, and a motor including a housing assembly integrated with the throttle body and including an output shaft operatively engaging the valve element for rotation therewith. A control circuit is provided which selectively energizes the motor to effect flow modulation, the circuit operative to receive a pwm position demand signal and to generate an input position demand signal as a time averaged function thereof, a first comparator operative to generate a position error signal as a function of the difference between the input demand signal and a sensed valving element position signal, a second comparator which generates a switch logic signal as a function of the difference between the position error signal and the sensed motor current, a switch for selectively energizing the motor in response to switch command signals and gating means which output the switch command signals in response to simultaneously receiving both the pwm demand and switch logic signals. This arrangement has the advantage of providing a compact integrated package within the engine compartment of a host vehicle with enhanced failsafing.

According to another aspect of the invention, circuit means are provided which operate to generate an error velocity signal as a function of the time rate of change of the error signal, wherein the second comparator generates the switch logic signal as a function of the difference between sensed motor current and the sum of the error signal and the error velocity signal. This arrangement has the advantage of enhancing system responsiveness.

According to another aspect of the invention, circuit means are provided which generate a motor acceleration signal as a function of sensed motor current, wherein the second comparator generates the switch logic signal as a function of the difference between sensed motor current and the sum of the error signal, the error velocity signal and the motor acceleration signal. This arrangement has the advantage of providing further system responsiveness.

According to another aspect of the invention, a third comparator is provided which generates a switch logic override signal whenever sensed motor current exceeds a set limit wherein the switch logic override signal disables the gating circit from outputting switch command signals and thereby controlling the throttle during a fault condition.

According to still another aspect of the invention, a fourth comparator is provided which generates a logic reset signal whenever both the switch command signal and sensed motor current exceeds a set limit whereby a microprocessor which functions to receive selective parametric input, including operator demand, and output the pwm position signal as a function thereof, is reset. This arrangement has the advantage of providing further measures to prevent inadvertent modulation of the throttle during a fulat condition.

These and other features and advantages of this invention will become apparent upon reading the following specification, which, along with the drawings, describes and discloses a preferred embodiment of the invention in detail.

The detailed description of the disclosed embodiment makes reference to the accompanying drawings.

DETAILED DESCRIPTION OF THE PREFERRED EMBODIMENT

Figure 1:
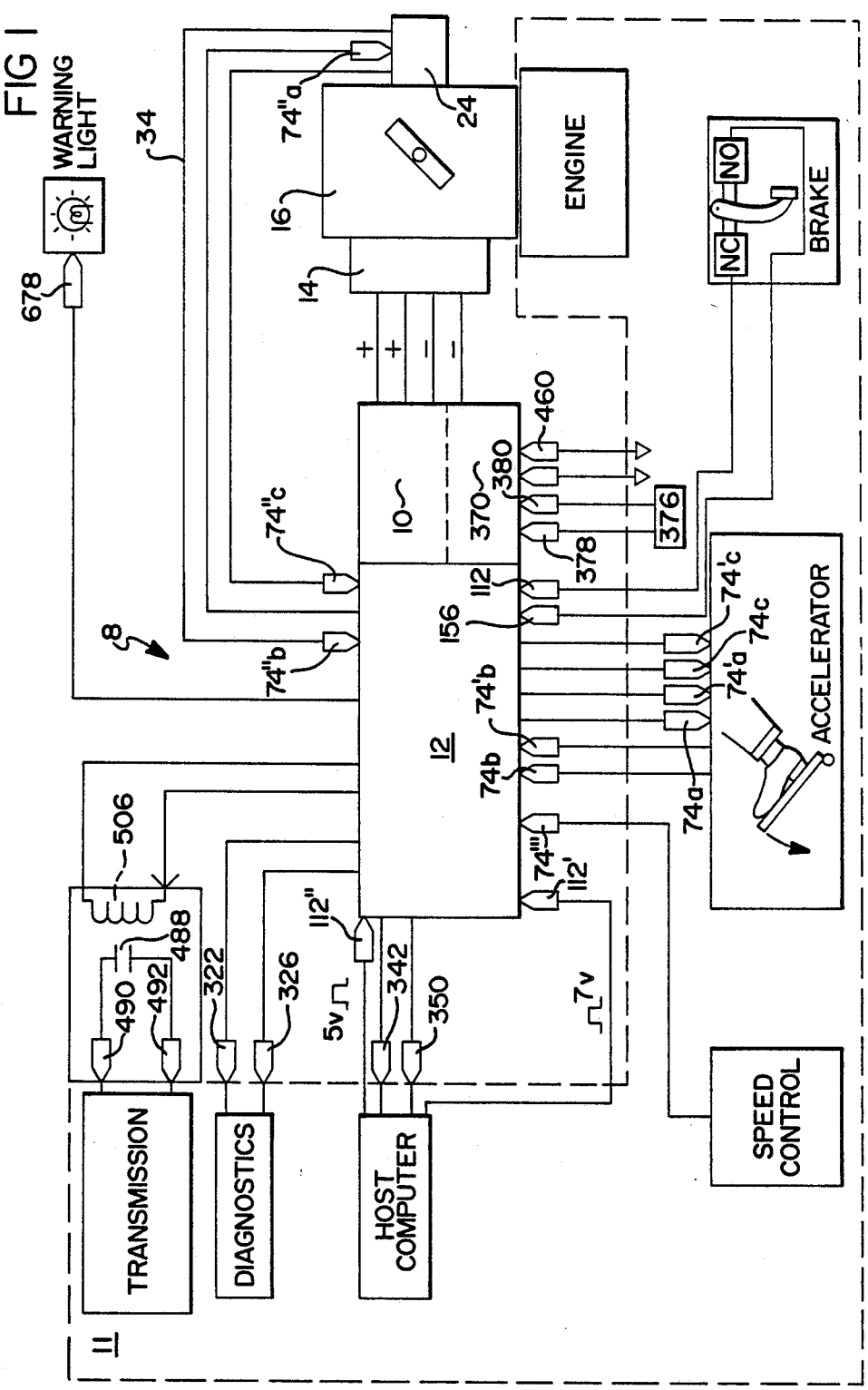
FIG. 1, is a schematic block diagram of the preferred embodiment of a throttle control system incorporated within a host automotive vehicle according to the present invention.

Referring to FIG. 1, a system 8 for providing electronic or "fly-by-wire" control of the engine throttle of a ground vehicle is illustrated in block diagram form. System 8 includes a control circuit 12 which serves as an interface between the host vehicle electrical system 11 and a throttle body 16 which, in its intended application, is mounted for controlling the air charge inlet of an internal combustion engine within the host vehicle. The airflow rate through throttle body 16 is controlled by a torque motor 14 which is mounted thereto and which is energized by a motor driver circuit 10 within control circuit 12.

The host vehicle electrical system 11 includes a number of sensors and transducers providing status, demand and condition inputs to control circuit 12 relating to operator and system demand, braking, speed control, as well as diagnostics and memory read write features. Control circuit 12, in turn, provides selective outputs to various host vehicle electrical system 11 components such as buffered power, throttle position, pedal position, speed demand, diagnostics and warning functions as well as transmission kick-down. Control circuit 12 is a microprocessor based system which, in addition to controlling torque motor 14 via motor driver circuit 10, provides cruise control, fault detection, failsafing, pedal sensor selection and sensor ranging logic functions. Control circuit 12 includes an internal pwm power supply 370 powered by the battery of the host vehicle. Throttle body 16 includes a position sensor 24 which mechanically determines the current setting of throttle body 16 and provides a feedback signal to control circuit 12. Key sensors and actuators within host vehicle electrical system 11 are provided with redundant interconnection with control circuit 12, particularly accelerator and brake pedal sensors, and torque motor 14 energization. This redundancy provides an improved level of fail-safing and overall system performance as will be described in detail hereinbelow.

Figures 2, 7, 8:
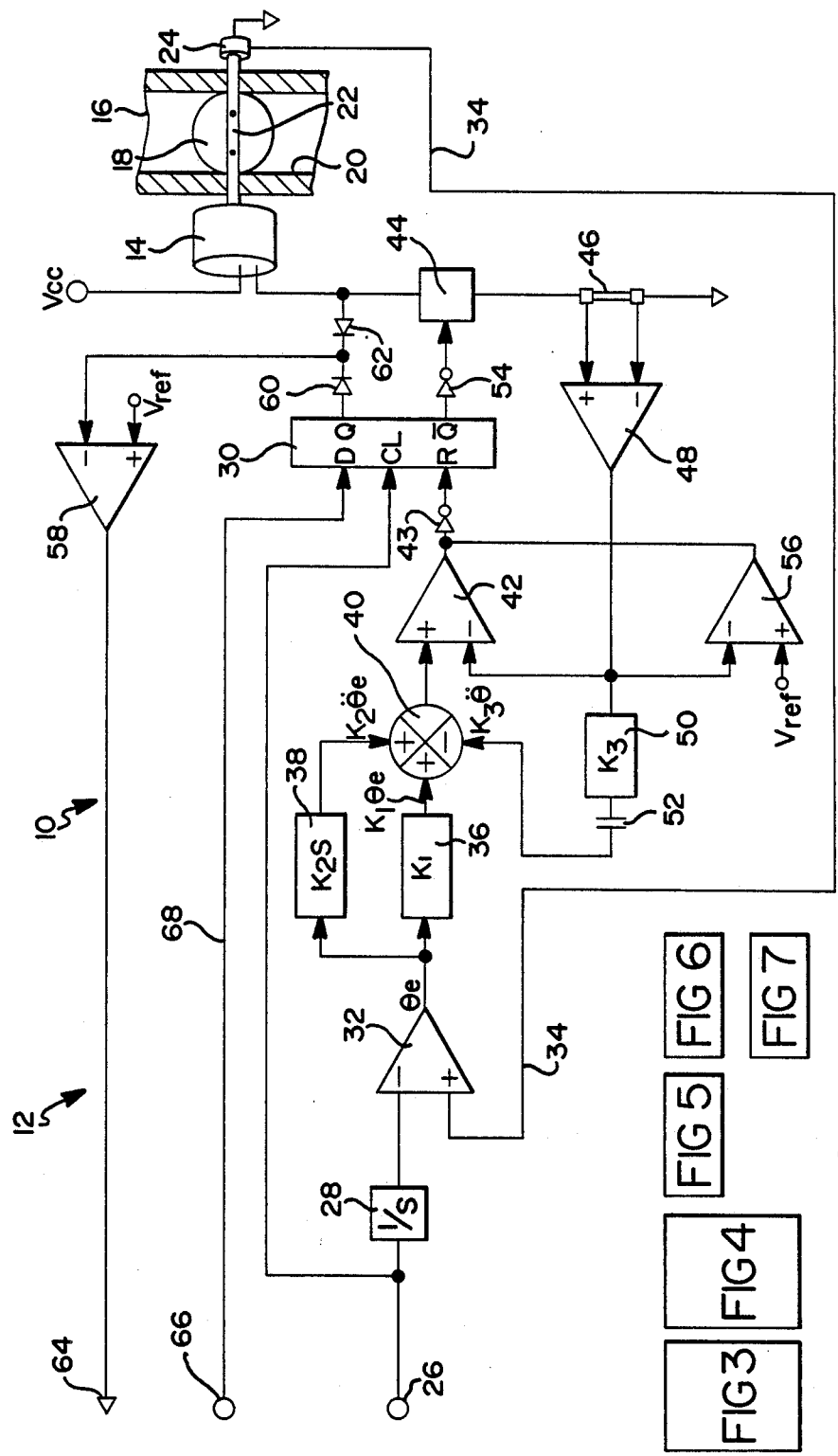
FIG. 2, is a detailed schematic block diagram of the motor driver circuit portion of the throttle control system of FIG. 1.
FIG. 7, is the load controller, and driver portion of the control circuit FIG. 1.
FIG. 8, is a diagram suggesting the relative positioning of drawing sheets containing FIGS. 3 through 7 as an aid in reading the detailed circuit description of the present invention.

Referring to FIG. 2, logic/driver circuit 10 is illustrated in simplified block diagram form. Driver circuit 10 is a portion of control circuit 12 shown collectively in detail in drawing FIGS. 3 through 7 hereinbelow which receives a pulse width modulated (pwm) position demand signal from elsewhere within control cirucuit 12 and selectively energizes torque motor 14 in response thereto. Torque motor 14 is in assembly with throttle body 16 and is preferably a reluctance torque motor operating as a rotary solenoid. However, other types such as stepper, brush type D.C. and permanent magnet torque motors could be substituted.

Motor 14 is electrically energized by variable D.C. current from driver circuit 10 to selectively position a butterfly valving element 18 disposed within an air inlet passageway 20 in response to operator or vehicle system demand signals generated to control circuit control 12 and host vehicle electrical system 11. Valving element 18 is carried for limited rotation within passageway 20 by motor output shaft 22. Shaft 22 also drives a position feedback potentiometer 24. The structural details of a preferred motor 14 and throttle body 16 is described in detail in a copending application filed on even date herewith, identified as Attorney Docket No. 87rCON170 entitled "Method and Apparatus for Positioning a Torque Motor Armature", the specification of which is incorporated herein by reference.

Driver circuit 10 receives a pwm position demand signal at terminal 26 and simultaneously feeds that signal to the input of a filter 28 and to the clock input terminal of a flip-flop 30. The integrated or time averaged output of integrator 28 is fed to the negative input of a comparator 32. The positive input of comparator 32 is connected to position feedback potentiometer 24 via line 34 resulting in comparator 32 outputting a position error signal ($\theta_e$) as a function of the difference therebetween. Comparator 32 is implemented as summing amplifier.

The output of comparator 32 is connected to compensator blocks 36 and 38 to produce ($K_1\theta_e$) and velocity ($K_2\theta_e$) terms, respectively, which are added at summing junction/node 40. The output of summing junction 40 constitutes a current demand signal which is fed to the positive input of a second comparator 42.

Motor 14 is electrically connected between a supply voltage source ($V_{cc}$) and circuit common in series with a switch 44 such as a field effect transistor (fet) and a low resistance current shunt 46. Whenever switch 44 is closed or electrically conducting, a current path between voltage source $V_{cc}$ and circuit common is established whereby motor 14 is electrically energized with current flowing therethrough. Motor current is sensed by shunt 46 which inputs a resulting measured differential voltage into the inputs of a amplifier 48, the output of which is a function of actual sensed motor current. The output of amplifier 48 is connected to the negative input of comparator 42 which outputs a switch logic signal as a function of the difference between demanded and measured motor current. The output of comparator 42 is interconnected to the reset terminal of flip-flop 30 through an inverter 43. The output of comparator 48 is also connected to a compensator block 50 connected in series with a capacitor 52 acting as a high pass filter, resulting in an acceleration term (equivalent to $K_3\theta$) being received at summing junction 40. The output of summing junction 40 will thus equal $K_1\theta_e + K_2\theta_e - K_3\theta$.

The Q output of flip-flop 30 outputs a switch command signal to switch 44 via an inverter 54.

The output of amplifier 48 is connected to the negative input of another comparator 56 whose positive input is connected to a predetermined reference voltage. The output of comparator 56 is wire ORed with comparator 42, inverted and connected to the reset input of flip-flop 30. The Q output of flip-flop 30 and the lower potential connection to motor 14 are interconnected to the negative input of a comparator through respective forward biased diodes 60 and 62. The positive input terminal of comparator 58 is connected to a voltage reference source and the output is connected to a terminal 64 communicating with the balance of control circuit 12. Finally, the data input terminal of flip-flop 30 is interconnected with the balance of control circuit 12 via a terminal 66 and interconnecting line 68.

Referring to drawing FIGS. 3 through 7, arranged as suggested in FIG. 8, the preferred embodiment of control circuit 12 is collectively illustrated in detailed schematic form.

Figure 3:
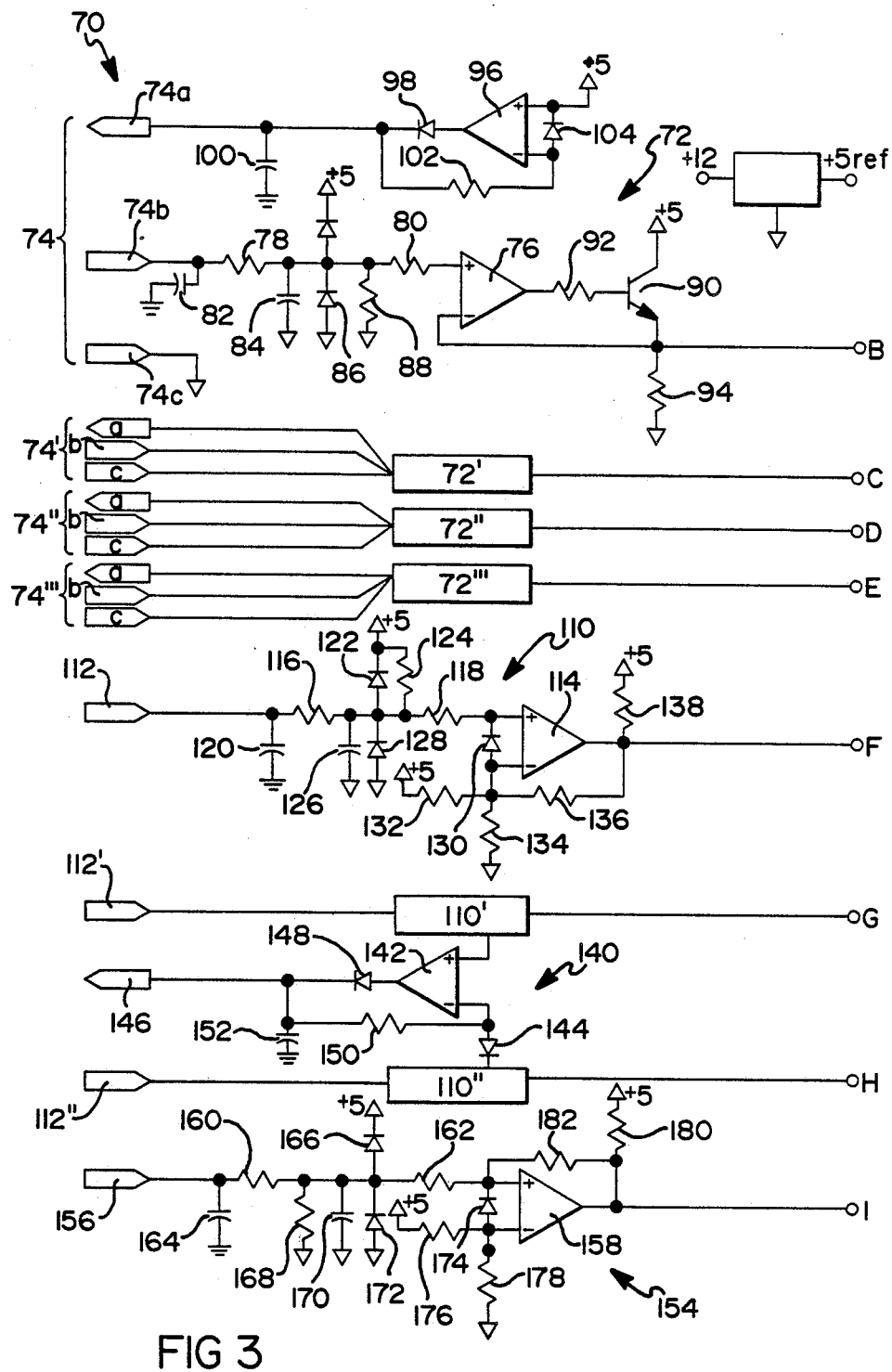
FIG. 3, is the input/output signal conditioning portion of the preferred control circuit of FIG. 1.

Referring to FIG. 3, an input buffer section 70 provides an input/output interface with the host vehicle electrical system 11. A typical amplifier/buffer section, shown generally at 72 receives a host parameter/condition signal at terminal set 74, which is fed to the positive input of an op amp 76 through an input protection circuit comprising two 1k ohm series connected resistors 78 and 80, whereo ne side of resistor 78 is connected to terminal 74b and to ground through a 0.001 microfarad capacitor 82. The point of common connection between resistors 78 and 80 is connected to circuit common through parallel connected 0.0068 capacitor 84 and a reverse biased diode 86. A 100k ohm resistor 88 can be connected to common or +5 vdc depending on the required response to an open circuit input. The output of op amp 76 is interconnected to the base of a type 2N4400 transistor 90 through a 330 ohm resistor 92. The collector of transistor 90 is connected to a +5 vdc power supply described in connection with FIG. 6. The negative input of op amp 76 is connected to the emitter of transistor 90, to circuit common through a 680 ohm resistor 94 and to an output terminal B. Amplifier/buffer 72 includes a second op amp 96 having its output interconnected with output terminal 74a of terminal set 74 through a forward biased diode 98. Terminal 74a is connected to ground through a 0.001 microfarad capacitor 100 and interconnected to the negative input terminal of op amp 96 through a 10k ohm resistor 102. The positive input of op amp 96 is connected to a separate regulated +5V reference power supply 97 and interconnected to the negative input terminal through a reverse biased diode 104. The portion of amplifier/buffer circuit 72 output at terminal 74a comprises a power supply to a host vehicle sensor. A return or demand signal is received from that sensor into terminal 74b and 74b c which is connected to circuit common.

Amplifier/buffer circuit 72 is also substantially replicated three additional times at 72', 72" and 72'" each including a terminal set 74', 74" and 74'", respectively, for receiving additional various demand or feedback signals from the host vehicle electronics and outputting those buffered signals to the balance of control circuit 12 via terminals C, D and E. In the preferred embodiment of the invention, the specific functions fed to terminal sets 74 through 74'" are accelerator position no. 1, accelerator position no. 2, throttle position and speed control, respectively.

Input buffer section 70 also includes a circuit 110 from host vehicle brake switch no. 1 via terminal 112 which is interconnected to the positive input terminal of a comparator 114 through series connected 1k and 10k resistors 116 and 118, respectively. Terminal 112 is connected to ground through a 0.001 microfarad capacitor 120. The point of common connection of resistors 116 and 118 is connected to the +5 vdc power supply through a parallel combination of a reverse biased diode 122 and a 1K resistor 124. The point of common connection of resistors 116 and 118 is also connected to circuit common through a parallel combination of a capacitor 126 and a reverse biased diode 128. The negative input terminal of op amp 114 is interconnected with the positive input terminal through a forward biased diode 130, to the +5 vdc power supply through a 1k ohm resistor 132, to circuit common through a 1k ohm resistor 134 and to the output terminal of op amp 114 through a 1 megohm resistor 136. The output terminal of op amp 114 is also connected to the +5 vdc power supply through 1 5.1k ohm resistor 138. Comparator 110 outputs a signal via terminal F. Digital comparator 110 is substantially replicated at 110', receiving ground speed and pwm position demand signals and outputting them via terminals G and H, respectively. Comparator circuits 110 are bridged by speed reference output circuit 140 which comprises an op amp 142 having its positive input terminal connected to the negative input terminal of the op amp of the upper comparator circuit 110' and its negative input terminal interconnected with the +5 vdc power supply through a reverse biased diode 144. The output terminal of op amp 142 is interconnected with an output terminal 146 through a forward biased diode 148. Terminal 146 is interconnected to the negative input terminal of op amp 142 through a 10k ohm resistor 150 and to ground through a 0.001 microfarad capacitor 152.

A modified circuit 154 receives an input from host vehicle brake switch no. 2 at terminal 156 which is interconnected with the positive input terminal of an op amp 158 through series connected 1k and 10k ohm resistors 160 and 162. Terminal 156 is also connected to ground through a 0.001 microfarad capacitor 164. The point of common connection between resistors 160 and 162 is interconnected to the +5 vdc power supply through a reverse biased diode 166 and to circuit common through a 100k ohm resistor 168, a capacitor 170 and a reverse biased diode 172. The negative input terminal of op amp 158 is interconnected to the plus input terminal through a reverse biased diode 174, to the +5 vdc power supply through a 1k ohm resistor 176 and to circuit common through a 1k ohm resistor 178. The output of op amp 158 is connected to terminal I, to the +5 vdc power supply through a 5.1k ohm resistor 180 and to the plus input terminal of op amp 158 through a one megohm resistor 182.

Input buffer section 70 operates to provide the buffered 5 volts out to the host vehicle sensors whereby if the line is shorted high or low, control circuit 12 is protected. This circuit also provides protection from overvoltages on the input signals.

Figure 4:
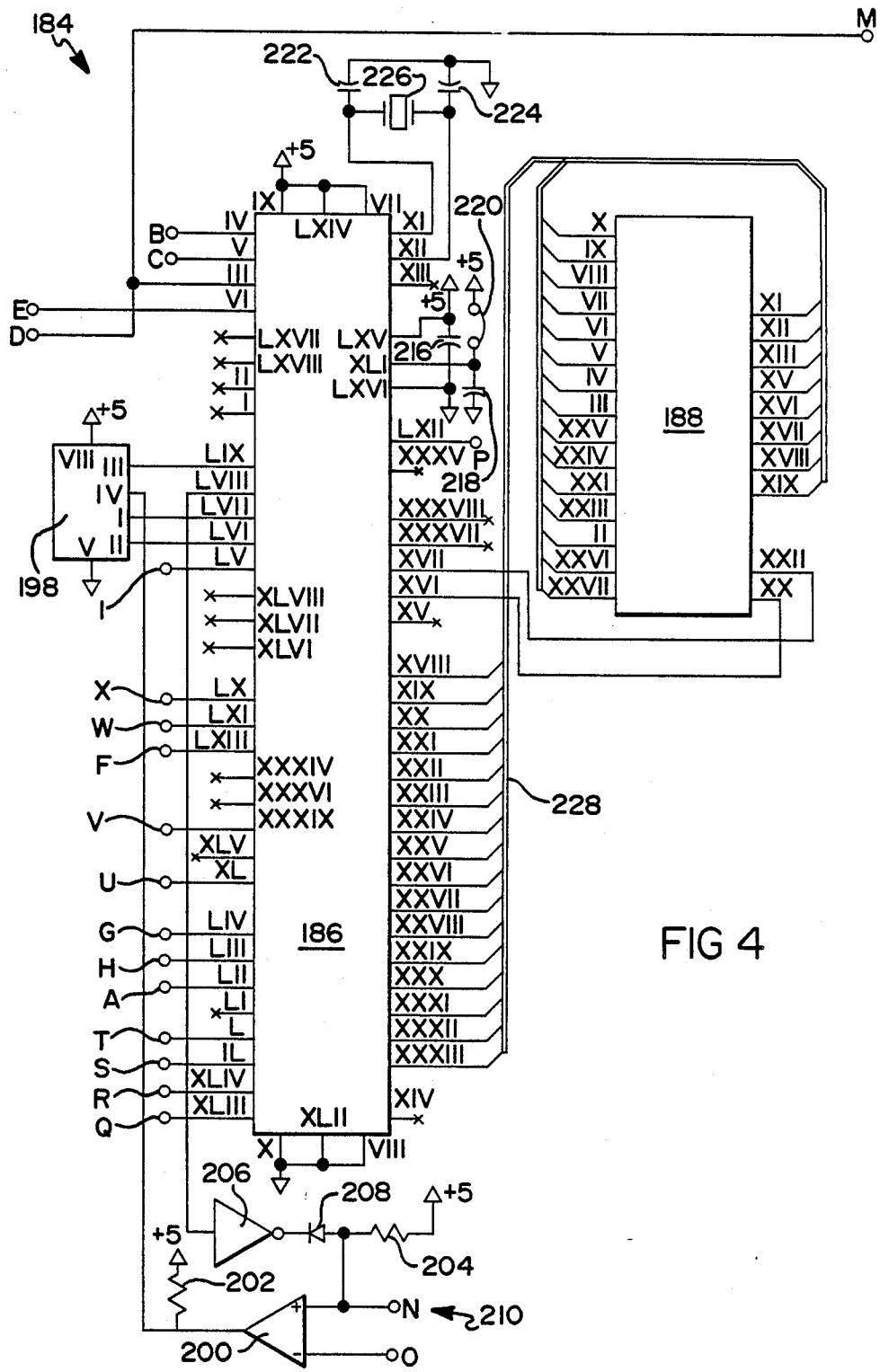
FIG. 4, is the microprocessor/memory portion of the control circuit of FIG. 1.

Referring to FIG. 4, a microprocessor portion of control circuit 12 is shown generally at 184 comprising an Intel type 8097 microprocessor 186 and an associated rom 188. Terminals B through I from input buffer section 70 of FIG. 1 are input into microprocessor input terminals IV, V, III, VI, LXIII, LIV, LIII and LV, respectively. Note that pin designations in Roman numerals relate to those numbers assigned by a particular manufacturer, it being understood that specific pin designations will vary from manufacturer to manufacturer. Terminal D is also connected to be fed out via terminal M as will be described in detail hereinbelow. In the preferred embodiment of the invention, operator/host vehicle demanded position is received from operator pedal sensors requesting a specific throttle position. To provide a safety margin, redundant sensors are provided to avoid unwanted acceleration. These sensor signals are received at terminal sets 74, 74' and fed to microprocessor circuit 184 via terminals B and C. The two throttle position sensors are constantly compared by the microprocessor 186 to establish that they are of the same value. Should the microprocessor sense that one of the sensors has gone open, has gone to the bus rail potential or ground, it immediately knows that the sensor has failed and presumes that the other sensor is still operational. If both sensors do fail, microprocessor will sense that contingency and shut the entire system down.

Terminals I, II and III of an $E^2$ rom device 198 are fed to terminals LVII, LVI and LIX, respectively, of microprocessor 186. Terminal VIII of the $E^2$ rom is connected to the +5 vdc power supply and terminal V is connected to circuit common. Terminal IV of $E^2$ rom is connected to the output of an op amp 200 and to the +5 vdc power supply through a 5.1k ohm resistor 202. The plus input terminal of op amp 202 is connected to terminal N and interconnected to the +5 vdc power supply through a 5.1k ohm resistor 204. The negative input terminal of op amp 200 is interconnected to terminal O. The plug input terminal of op am 200 is interconnected with terminal LVIII of microprocessor 186 through a series combination of an inverter 206 and a reverse biased diode 208. Op amp 200 and associated componentry comprise a gating circuit 210 which operates in cooperation with $E^2$ rom 198 as described hereinbelow.

Returning to the above cited example, control circuit 12 has two levels of reliability within microprocessor 186 knows that one of the throttle operator demand position sensors has failed and can store that information in $E^2$ rom 198 and also output a signal to a warning light circuit designated 360 (see FIG. 5) advising that the failure has been sensed and addressed. The watch-dog circuit 212 outputs a drive inhibit signal that is received by the data input of flip-flop 30 via line 66 of FIG. 2. Any time that the watch-dog puts the microprocessor into reset, it also inhibits the drive. The watch-dog 212 includes a type TL7705 supervisor chip 214 which, in effect, monitors the entire circuit during power-up. Any time system voltage falls below 4.5 volts, it shuts the system off. The $E^2$ rom 198 was added to the system as a way of documenting what faults the system sees. If the system senses a sticking throttle body, or if the drive transistor fails, for example, the $E^2$ rom can retain this information permanently for subsequent system diagnostics.

Terminals IX, LXIV and VII of microprocessor 186 are connected to the +5 vdc power supply and terminals X, XLII and VIII are connected to circuit common. Terminal LXV is connected to the +5 vdc power supply and interconnected to circuit common through a capacitor 216. Terminal LXVI is connected directly to circuit common. Terminal XLI is interconnected to circuit common through a 0.01 microfarad capacitor 218 and interconnected to the +5 vdc power supply through a removable jumper 220. Terminals XI and XII are interconnected with circuit common through 33 picofarad capacitors 222 and 224, respectively, and interconnected to one another by a type ATS49 12 MHz crystal 226. Terminal LXII is output to terminal P and terminals XVII and XVI are connected to terminals XXII and XX of rom 188, respectively. Finally, terminals XVIII through XXXIII of microprocessor 186 are interconnected to terminals II through XXVII of rom 188 via a bus 228. Terminals XLIII, XLIV, IL, L, XL, XXXIX, LXI, LX and LII of microprocessor 186 are output to terminals Q, R, S, T, U, V, W, X and A, respectively. The remaining terminals of microprocessor 186 are unused.

Figure 5:
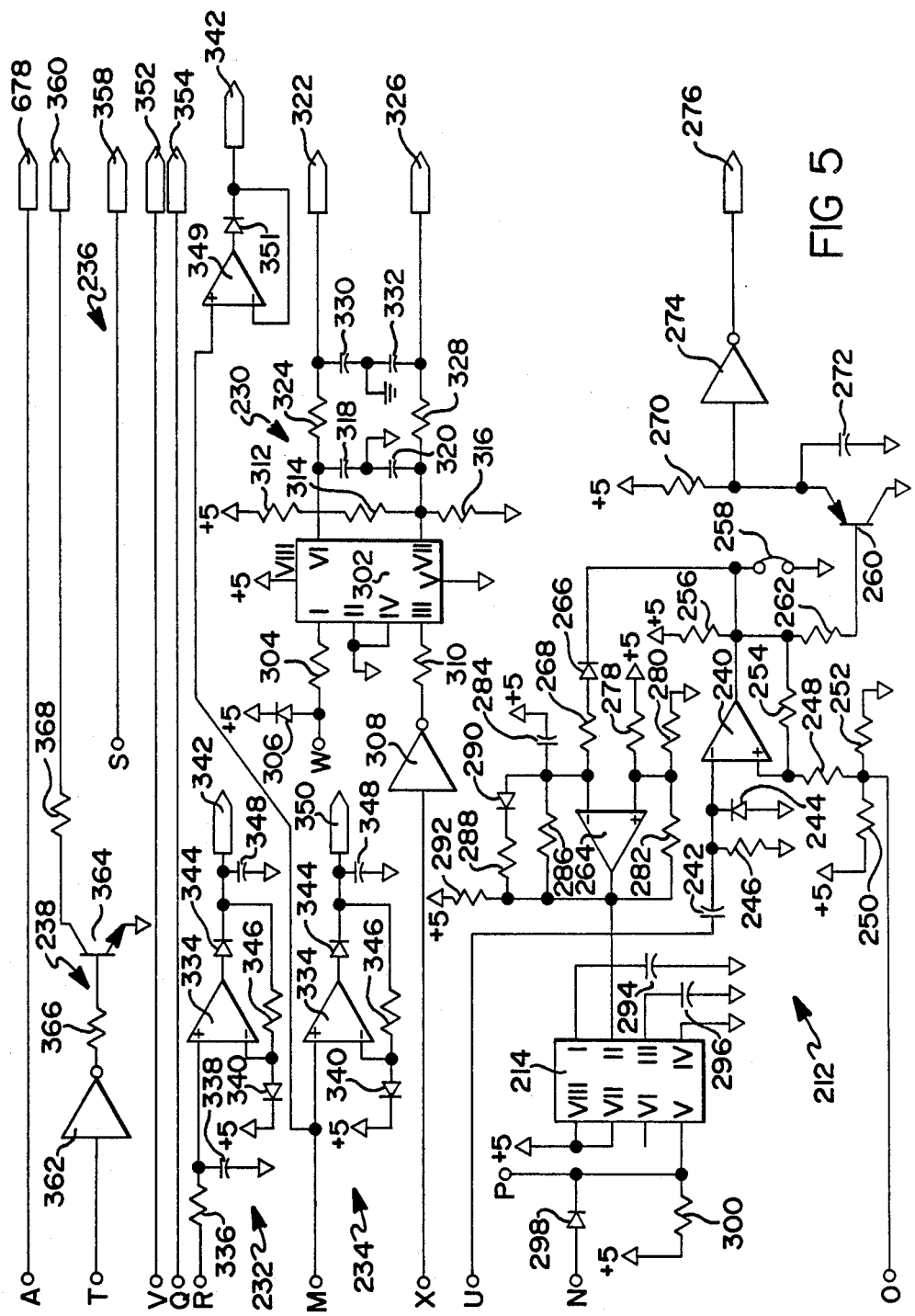
FIG. 5, is the output analog buffer, read/write system modification and "watch dog" portion of the control circuit of FIG. 1.

Referring to FIG. 5, the details of watch-dog circuit 212 as well as a read/write circuit 230, output analog buffer circuits 232 and 234, a buffer to drive circuit 236 and a host output circuit 238 are illustrated in detail. Watch-dog circuit 212 receives an input from microprocessor 186 via terminal U into the negative input terminal of an op am 240 through a 0.002 microfarad capacitor 242. The negative terminal of op amp 240 is also connected to circuit common through a type 1N4448 diode 244 and a 100k ohm resistor 246. Terminal O is interconnected with the positive terminal of op amp 240 through a 10k ohm series resistor 248. Terminal O is also interconnected to the +5 vdc power supply through a 1k ohm resistor 250 and to circuit common through a 1k ohm resistor 252. The output terminal of comparator 240 is interconnected with the positive input terminal through a 100k ohm feedback resistor 254, to the +5 vdc power supply through a 4.7k ohm resistor 256 to circuit common through a removable jumper 258, to the base of a type 2N4402 transistor 260 through a 1k ohm resistor 262 and to the negative input terminal of another op amp 264 through the series combination of a reverse biased type 1N4448 diode 266 and a 150 ohm resistor 268. The emiter of transistor 260 is interconnected to the +5 vdc power supply through a 4.7k ohm resistor 270 and to circuit common through a 0.08 microfarad capacitor 272. The collector of transistor 260 is connected directly to circuit common. The emitter of transistor 260 represents the output of watchdog circuit 212 feeding through an inverter 274 to a terminal 276 which goes low to disable flip-flop 30 whenever microprocessor 186 is in reset.

The positive input terminal of comparator 264 is connected to the +5 vdc power supply through a 100k ohm resistor 278, to circuit common through a 100k ohm resistor 280 and to the output terminal of comparator 264 through a 100 ohm feedback resistor 282. The negative input terminal of comparator 264 is connected to the +5 vdc power supply through a 1.0 microfarad capacitor 284 and to the output terminal thereof through a parallel combination of a 100k ohm resistor 286 and a series connected 1k ohm resistor 288 and reverse biased type 1N4440 diode 290. The output of comparator 264 is connected directly to input terminal II of supervisor chip 214 as well as to the +5 vdc power supply through a 5.1k ohm resistor 292. Terminal IV of supervisor chip 214 is connected directly to circuit common and terminals I and III are interconnected to circuit common through 0.1 and 10 microfarad capacitors 294 and 296, respectively. Terminals VII and VIII of supervisor chip 214 are connected directly to terminal P and interconnected to terminal N through a diode 298. Terminal V of supervisor chip 214 is also interconnected to the +5 vdc power supply through a 10k ohm resistor 300.

Read/write circuit 230 is interconnected to microprocessor 186 via terminals W and X. Terminal W is interconnected to terminal I of an ATA interface buffer 302 of the type manufactured by National Semiconductor, type DS3695TN through a 2k ohm resistor 304. Terminal W is also interconnected to the +5 vdc power supply through a type 1N4440 diode 306. Terminals II and IV of interface buffer 302 are connected to circuit common and terminal III is interconnected with terminal X through a series combination of an inverter 308 and a 2k ohm resistor 310. Terminal VIII of buffer 302 is connected to the +5 vdc power supply and terminal V is connected to circuit common. Terminal VI is interconnected to the +5 vdc power supply through a 470 ohm resistor 312 and to terminal VII through a 1.5k ohm resistor 314. Terminal VII is interconnected to circuit common through a 470 ohm resistor 316. Terminals VI and VII of buffer 302 are interconnected by a series combination of two 0.0022 microfarad capacitors 318 and 320, the point of common connection of which is connected to circuit common. Terminal VI is interconnected with output terminal 322 through a 47 ohm resistor 324. Likewise, output terminal 326 is interconnected with terminal VII through a 47 ohm resistor 328.

Terminals 322 and 326 are interconnected by a series combination of two 500 picofarad capacitors 330 and 332, the point of common connection of which is connected to ground.

Buffer circuit 232 comprises an op amp 334 having its positive input terminal interconnected with terminal R through a resistor 336 and to circuit common through a capacitor 338. The negative input terminal of op amp 334 is interconnected to the +5 vdc power supply through a diode 340. The output terminal of op amp 334 is interconnected with an output terminal 342 through a diode 344. The negative input terminal of op amp 334 is interconnected with terminal 342 through a series 10k ohm resistor 346. Finally, terminal 342 is connected to circuit common through a 330 picofarad capacitor 348.

Buffer circuit 234 is substantially identical to circuit 232 wherein it interconnects terminal M with output terminal 350 with the exception of the removal of resistor s336 and capacitor 338. Furthermore, buffer circuit 234 includes an additional stage including an op amp 349 having its positive input terminal connected to terminal M and its output terminal interconnected to terminal 342 through a diode 351 for outputting a throttle position feedback signal to drive circuit 10. Output terminal 342 provides a pedal position demand signal and terminal 350 provides a throttle position signal, for the host vehicle electrical system 11. Terminal V is interconnected with the terminal 352 to transfer a pwm demand signal output from microprocessor 186 to control circuit 12 (see FIG. 2) as will be described in detail hereinbelow. Terminal Q transfers a signal to terminal 354 activating an enabling relay as will be described hereinbelow. Terminal S outputs a kick-down signal to a terminal 358. Terminal T receives a failure warning signal from microprocessor 186, buffers it in host output circuit 238 and outputs it via terminal 360 to host vehicle electronics 11 for activating a warning device. Buffer circuit 238 comprises an inverter 362 receiving an input from terminal T and having an output interconnected to the base of a transistor 364 through a 4.7k ohm resistor 366. The emitter of transistor 364 is connected to circuit common and the collector is interconnected with terminal 360 through a 500 ohm resistor 368.

Figure 6:
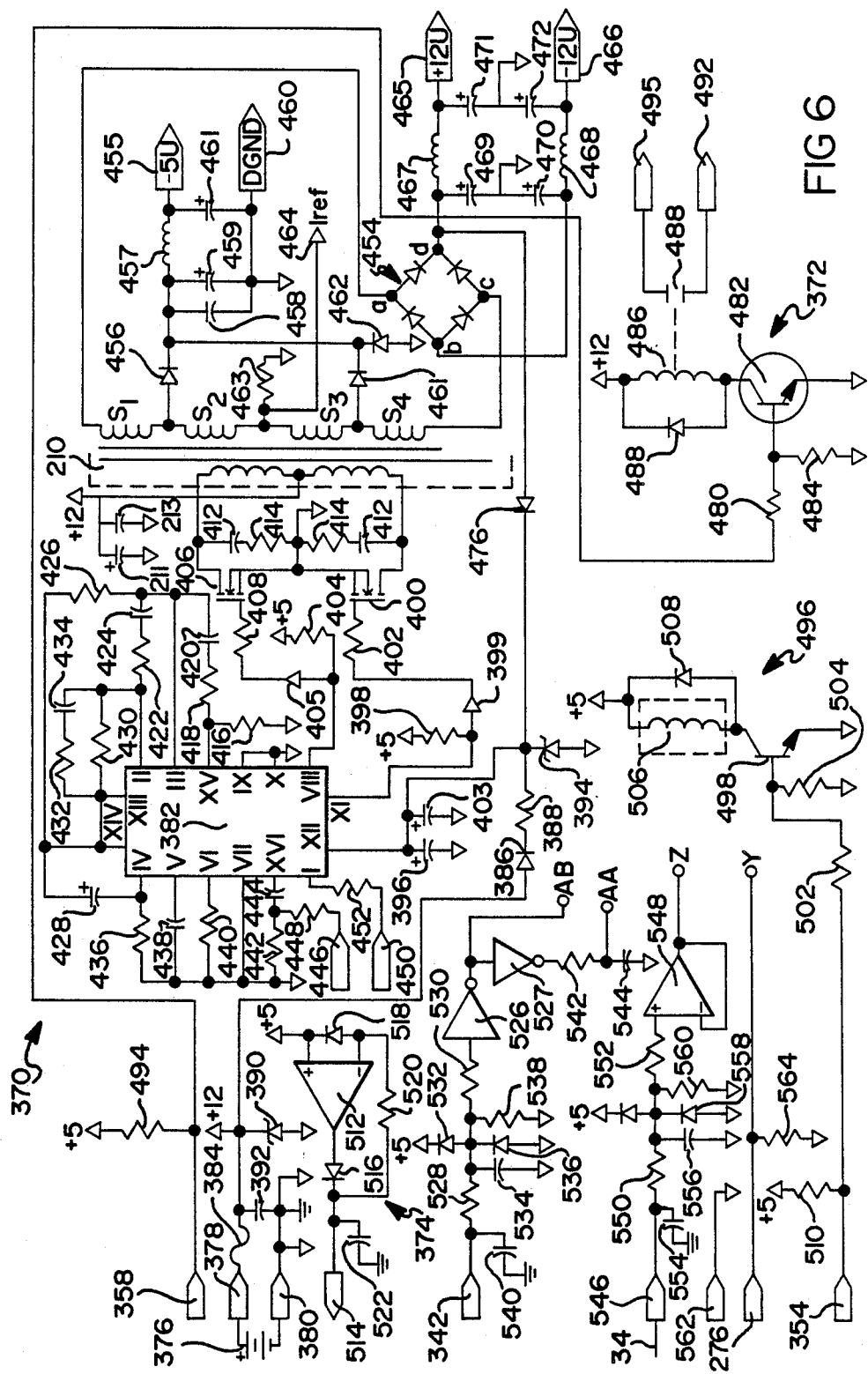
FIG. 6, is the pwm power supply and further system buffering of the control circuit of FIG. 1.
Figure 7:
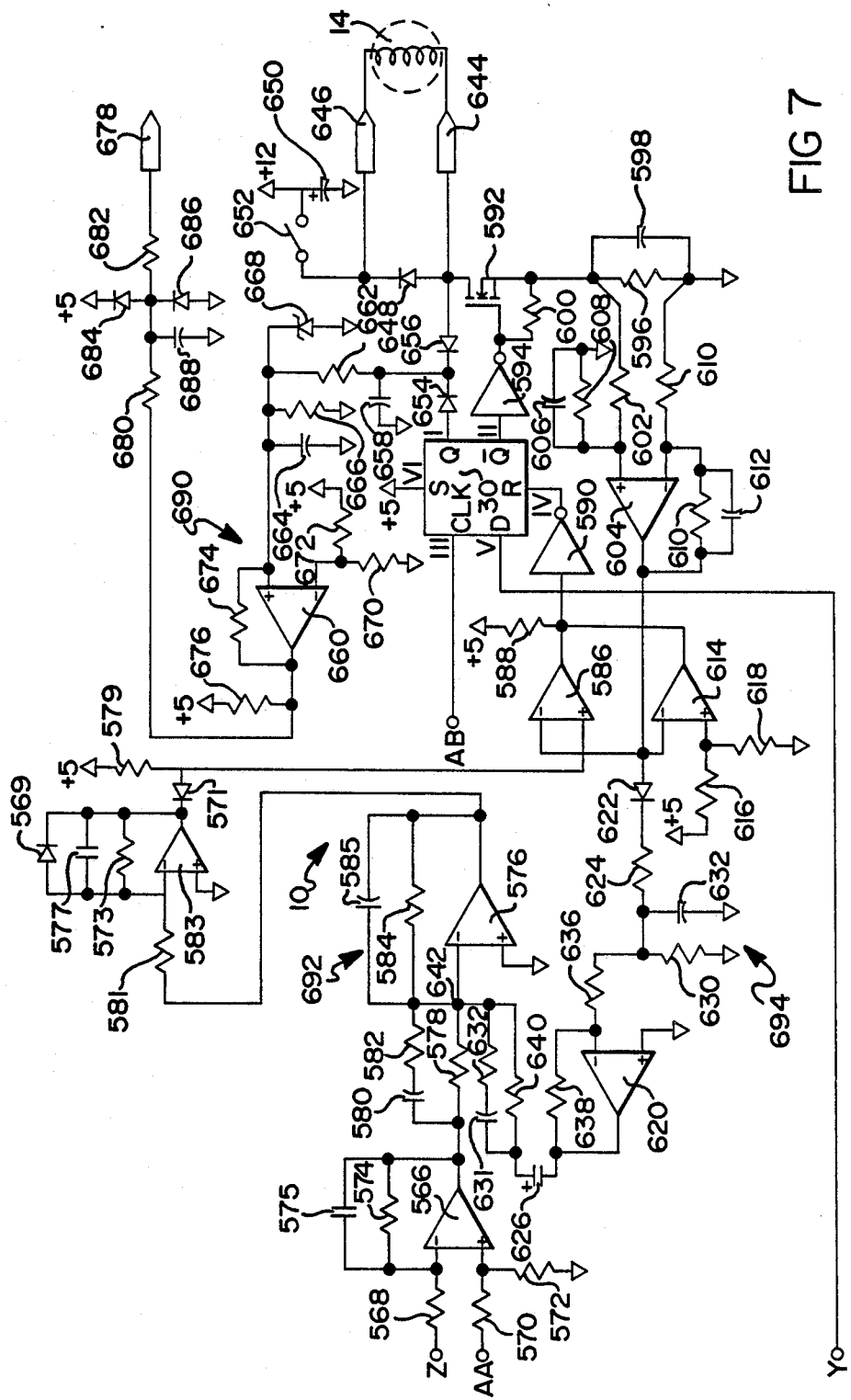

Referring to FIG. 6, a pwm power supply circuit shown generally at 370, a kick-down circuit 372 and a power output buffer 374 is powered by the host vehicle battery 376 via positive input terminal 378 and negative input terminal 380. Terminal 380 is connected to both circuit common and ground. Terminal 378 is interconnected to terminal XII of a TL494 regulator circuit 382 through a series connected fuse 384, type R115C diode 386 and resistor 388. The point of common connection between fuse 384 and diode 386 is connected to circuit common through a reverse biased zener diode 390 and interconnected to terminal 380 through a 0.001 microfarad capacitor 392. Terminal XII of circuit 382 is interconnected to circuit common through a parallel connected zener diode 394, a 15 microfarad electrolytic capacitor 396 and a 0.1 microfarad capacitor 396. Terminals X and IX of circuit 382 are connected to circuit common. Terminal XI is interconnected to the +5 VDC power supply through a 1k ohm resistor 398 and to the gate of a type IRF510 FET 400 through a series connected resistor 402 and inverter 399. Likewise, terminal VIII of circuit 382 is interconnected to the +5 VDC power supply through a 1k ohm resistor 404 and to the gate of an FET 406 thrugh a series connected resistor 408 and inverter 405. FETs 400 and 406 are connected with their sources commonly connected to chassis common and their drains connected to the end taps of the primary winding of a power transformer 210. The center tap of primary winding of transformer 210 is connected to a system 12 volt voltage source, and is interconnected to circuit common through parallel 15 microfarad electrolytic capacitor 211 and 0.1 microfarad capacitor 213. The point of common connection between fuse 384 and diode 390 represents the +12 vdc system voltage tap. The drain and source terminals of FETs 400 and 406 are interconnected by separate series capacitors 412 and resistor 414.

Terminal XV of circuit 382 is interconnected to circuit common through a 200 ohm resistor 416 and to terminal III of circuit 382 through a series connected 20k ohm resistor 418 and 1.0 microfarad capacitor 420. Terminal II of circuit 382 is likewise interconnected with terminal III through a series 20k ohm resistor 422 and 100 picofarad capacitor 424. Terminal III of circuit 382 is also interconnected with terminal IV of circuit 382 through a series connected resistor 426 and 10.0 microfarad electrolytic capacitor 428. The point of common connection between resistor 426 and 428 is directly connected to terminals XIV and XIII of circuit 382. Terminals XIII and II of circuit 382 are interconnected by a parallel combination of a 47k ohm resistor 430 and a series coupled 20k ohm resistor 432 and 680 PF capacitor 434. Terminals IV, V and VI of circuit 382 are interconnected to circit common through a 10k ohm resistor 436, a 0.01 microfarad capacitor 438 and a 2k ohm precision resistor 440, respectively. Terminal VII of circuit 382 is directly connected to circuit common and terminal XVI of circuit 382 is interconnected with circuit common through a series 1k ohm resistor 442 and 0.1 microfarad capacitor 444. The point of common connection between resistor 442 and capacitor 444 is interconnected to a reference current input terminal 446 through a 1k ohm resistor 448, the function of which will be described hereinbelow. Likewise, terminal I of circuit 382 is interconnected with a +5 v input terminal 450 through a 4.7k ohm resistor 452 as will be described hereinbelow.

Transformer 210 comprises four series connected secondary windings designated S1 through S4 which, as viewed in FIG. 6, has the end taps or the uppermost terminal of S1 and the lowermost terminal of S4 connected to opposite corners (A and C) of a four diode bridge 454. The point of common connection between windings S1 and S2 are interconnected to a +5 vdc voltage source output terminal 455 through a series connected diode 456 and a 10 microhenry choke 457. The point of common connection between the diode 456 and choke 457 is interconnected to circuit common through a parallel 0.1 microfarad capacitor 458 and a 470 microfarad electrolytic capacitor 459. The point of common connection between choke 457 and terminal 455 is also electrically interconnected to circuit common and a ground terminal 460 through a 15 microfarad capacitor 461.

The point of common connection between secondary windings S3 and S4 are interconnected to the point of common connection between diode 456 and choke 457 by a diode 461. The point of common connection between the secondary windings S2 and S3 is connected to circuit common through a 0.2 ohm resistor 463 and represents a current reference terminal 464 interconnected with terminal 446.

The remainng corners (B and D) of diode bridge 454 are interconnected with ±12 vdc power supply source terminals 465 and 466 through separate 150 microhenry chokes 467 and 468. The points of common connection between bridge 454 (corners D and B) and chokes 467 and 467 are interconnected by two series connected 15 microfarad electrolytic capacitors 469 and 470, the point of common connection therebetween being directly tied to circuit common. Likewise, the respective points of common connection between chokes 467 and 468 and terminals 465 and 466 are interconnected by series connected 1 microfarad electrolytic capacitors 471 and 472, the point of common connection therebetween being directly tied to circuit common. The point of common connection between bridge 454 corner d and choke 467 is interconnected with terminals XII, XI and VIII of circuit 382 through a diode 476.

Whenever power supply circuit 370 receives between 8 and 24 volts at terminals 378 and 380, the power supply is operative and the balance of control circuit 12 energized. Control circuit 12 will also operate as described herein. Even if the voltage level across terminals 378 and 380 falls to as low as 5 volts, such as during start-up of the host vehicle with a severely discharged battery, as long as the battery voltage was at least 8 volts for the initial 100 milliseconds of energization during which pwm power supply circuit 370 bootstraps itself up to provide adequate voltage levels for the logic in the balnce of the circuit.

Kick-down circuit 372 receives a signal from the microprocessor 186 via terminal 358 hrough a 2k ohm resistor 480 to the base of a type 2N4400 transistor 482. The emitter of transistor 482 is connected to circuit common and the base is interconnected with circuit common through a 1k ohm resistor 484. The collector of transistor 482 is interconnected to the +12 vdc power supply through a relay coil 486 in parallel with a diode 488. A (transmission) kick-down signal received at terminal 358 will energize relay coil 486, closing contacts 488, thereby closing a circuit in a host vehicle kick-down circuit (not illustrated) via terminals 490 and 492. Terminal 358 is interconnected to the +5 vdc power supply through a 100k ohm resistor 494.

Similarly, a relay circuit 496 is also provided which receives an activation signal at terminal 354 from microprocessor 186. Terminal 354 is interconnected with the base of a type 2N4400 transistor 498 through 1 2k ohm resistor 502. The emitter of transistor 498 is connected to circuit common directly and the base is interconnected to circuit common through a 1k ohm resistor 504. The collector of transistor 498 is interconnected to the +5 vdc power supply through the coil of a relay parallel reverse biased diode 508. The contacts (not shown) associated with relay 506 can be used to complete another circuit within the host vehicle electrical system 11. Terminal 354 is interconnected with a +5 vdc power supply through a 100k ohm resistor 510.

Power output buffer circuit 374 is provided for energizing a related host vehicle sensor and includes an op amp 512 interconnected with an output terminal 514 through an intermediate forward biased diode 516. The plus terminal of op amp 512 is directly connected to the +5 vdc power supply and interconnected with the minus input terminal through a diode 518. The negative terminal of op amp 512 is interconnected to the point of common connnection between terminal 514 and diode 516 by a 1k ohm resistor 520. The point of common connection between terminal 514 and diode 516 is also connected to ground through a capacitor 522.

The pwm demand signal is received from microprocessor 186 at terminal 342. The pwm demand signal is fed to a logic inverter 526 through series connected 1k ohm resistors 528 and 530. The point of common connection between resistors 528 and 530 is interconnected with the +5 vdc power supply through a diode 532 and to circuit common through a 0.001 microfarad capacitor 534, a diode 536 and a 100k ohm resistor 538. The point of common connection between terminal 342 and resistor 528 is interconnected with circuit common through a capacitor 540. The output of inverter 526 is fed to the input of another inverter 527. The output of inverter 527 is interconnected with circuit common through a series 5.1k ohm resistor 542 and 1 microfarad capacitor 544. The point of common connection between resistor 542 and capacitor 544 is connected to terminal AA. The point of common connection between inverters 526 and 527 is connected with terminal AB.

The throttle position feedback signal is received via line 34 at terminal 546 which is interconnected with the plus input terminal of an op amp 548 through series connected 1k ohm resistors 550 and 552. The point of common connection between terminal 546 and resistor 550 is interconnected to ground through a capacitor 554. The point of common connection between resistors 550 and 552 is connected to circuit common through a 0.001 microfarad capacitor 556, a diode 558 and a 100k ohm resistor 560. The output terminal of op amp 548 is connected to terminal Z and to the negative input terminal of op amp 548. A circuit common ground terminal 562 is provided when a throttle position feedback signal ground line is required.

A drive inhibit line is received at terminal 276 which is connected to a terminal Y and interconnected to circuit common through a 100k ohm resistor 564.

Referring to FIG. 7, the drive inhibit line is received at terminal Y and fed to the D (data) input terminal V of flip-flop 30. Terminal AB is directly connected to the clock input terminal III of flip-flop 30. Terminals Z and AA are interconnected to the minus and plus inputs of an op amp 566 through respective 50k ohm resistors 568 and 570. The positive input of op amp 566 is interconnected to circuit common through a 200k ohm resistor 572 and the negative input terminal of op amp 566 is interconnected with the output thereof through a parallel combination of a 200k ohm resistor 574 and 100 picofarad capacitor 575. The output of op amp 566 is interconnected with the negative input of another op amp 576 through a 35k ohm resistor 578 in parallel connection with a 0.26 microfarad capacitor 580 and 1.5k ohm resistor 582. The output of op amp 576 is interconnected with the negative input thereof through the parallel combination of a 62k ohm resistor 584 and a 100 picofarad capacitor 585, and is interconnected with the positive input terminal of an op amp 583 through a 43k ohm resistor 581. The positive input terminals of op amps 576 and 583 are connected to circuit common. The output of op amp 583 is interconnected with a parallel combination of a diode 569, a 100 picofarad capacitor 571 and a 499k ohm resistor 573. The output of op amp 583 is interconnected with the +5 vdc power supply through a series combination of a diode 571 and a 10k ohm resistor 579 and the positive input terminal of a comparator 586 through diode 571. The output of comparator 586 is interconnected to the +5 vdc power supply through a 10k ohm resistor 588 and to the reset terminal IV of flop-flop 30 through an inverter 590.

The $\overline{Q}$ output II of flip-flop 30 is interconnected to the gate terminal of a type IRFZ32 FET 592 through an inverter 594. The source of FET 594 is interconnected to circuit common through a parallel 0.05 ohm shunt resistor 596 and 0.001 microfarad capacitor 598. A 10k ohm resistor 600 interconnects the output of 594 and source terminals of FET 592. A 12.4k ohm precision resistor 602 interconnects the positive input terminal of an op amp 604 and the point of common connection between resistor 596 and the source of FET 592. The positive terminal of op amp 604 is also connected to circuit common through a parallel combination of a 22 picofarad capacitor 606 and 100k ohm resistor 608. The negative input terminal of op amp 604 is interconnected with circuit common through a 12.4k ohm precision resistor 610. The negative input terminal and output terminal of op amp 604 is interconnected by a parallel combination of a 100k ohm resistor 610 and a 22 picofarad capacitor 612.

The output of op amp 604 is connected to the negative input of comparator 586 and the negative input of an another comparator 614. The output of comparator 614 is connected to the output of op amp 586. The positive input terminal of op amp 614 is connected to the +5 vdc power supply through a 1k ohm resistor 618 and to circuit common through a 4k ohm resistor 618. The output of op amp 604 is also interconnected with the minus input terminal of another op amp 620 through a series connected diode 622, 560 ohm resistor 624, and a 36k ohm resistor 636. The point of common connection between resistors 624 and 636 is connected to circuit common through a parallel combination of a 22k ohm resistor 630 and a 2.2 microfarad capacitor 632. The negative input terminal of op amp 620 is interconnected to the output terminal thereof by a 10k ohm resistor 638. The output of op amp 620 is interconnected to the minus input terminal of op amp 576 by a 15 microfarad capacitor disposed in series with a resistor 640. The point of common connection between capacitor 626 and resistor 640 is interconnected to the minus input terminal of op amp 576 by a series connected 47 microfarad capacitor 631 and 20k ohm resistor 632. The point of common connection of resistors 578, 582 and 640 is designated as a node 642.

The drain of FET 592 is connected to a minus motor output voltage terminal 644 and interconnected with a positive motor output voltage terminal 646 by a type MUR1505 diode 648. Terminal 646 is interconnected to the +12 vdc power supply through a normally open manually switch 652. The high side of switch 652 is connected to circuit common by a 100 microfarad electrolytic capacitor 650.

The Q output terminal I of flip-flop 30 is interconnected with terminal 644 through series opposed diodes 654 and 656. The point of common connection between diodes 654 and 656 is interconnected to circuit common through a 0.001 mocrofarad capacitor 658 and interconnected to the positive input terminal of an op amp 60 by a 4.3k ohm resistor 662. The positive input terminal of op amp 660 is interconnected to circuit common by parallel 0.01 microfarad capacitor 664, 43k ohm resistor 666 and zener diode 668. The negative input terminal of op amp 660 is interconnected to circuit common through a 10k ohm resistor 670 and to the plus 5 vdc power supply through a 10k ohm resistor 672. The positive input terminal of op amp 660 is also interconnected with the output terminal thereof through a 1 megohm resistor 674. The output terminal of op amp 660 is connected to the +5 vdc power supply through a 10k ohm resistor 676 and to a current fault output terminal 678 through series 1k ohm resistors 680 and 682. The point of common connection between resistors 680 and 682 is connected to the +5 vdc power supply by a diode 684 and to circuit common by another diode 686 as well as a 0.1 microfarad capacitor 688.

Referring to FIGS. 2 and 7, op amp 660 and its associated componentry constitutes a transistor drive fault detection circuit shown generally at 690, op amp 660 corrolating with comparator 58. Fault detection circuit 690 senses a condition when the transistor should be off, i.e. the Q output of flip-flop 30 is low and the transistor is actually on, meaning the drain potential on FET 592 is low. Under that condition, both diodes 654 and 656 are reverse biased. The RC network formed by resistor 666 and capacitor 664 discharges and reduces the voltage at the positive input of op amp 660 to the point where it goes below the comparative minus value and the op amp 660 toggles to output a fault condition at terminal 678. If for example, the transistor is destroyed in an open condition, the drive does not detect the failure directly. However, that is an acceptable senerio inasmuch as the motor will not turn on in any condition.

To further assist in the correlation between FIGS. 2 and 7, inverter 594 corresponds with inverter 54, FET 592 corresponds with switch 44, diodes 654 and 656 correspond with diodes 60 and 62, respectively, resistor 596 corresponds with shunt 46, op amp 604 corresponds with amplifier 48, comparators 586 and 614 correspond with comparators 42 and 56, op amp 576 and associated componentry correspond with summing junction 40, and op amp 566 corresponds with comparator 32.

Basic operation of driver circuit 10 is as follows. The host vehicle driver commands a particular throttle setting and the host vehicle electronics respond with a demand input at amplifier/buffer sections 110". The microprocessor will then output a pwm demand signal which is received at terminal 342 between a 5% and 95% duty cycle. Resistor 542 and capacitor 544 comprise a low pass filter providing a time average value of the input pwm signal. The integration rate is very slow in comparison to the frequency of the pwm which runs nominally at 15.5 kHz, while the break point of the filter is approximately 100 Hz. The filtered signal then constitutes a position demand which is compared against the actual position of valving element 18 via feedback potentiometer 24, which feedback signal enters circuit 10 at terminal 546. The resulting comparison or error output of op amp 566 is a position error which is compensated by a circuit shown generally at 692, including op amp 576 and its associated componentry wherein the error signal is given a lead or velocity component by capacitor 580 and resistor 582 and added with the position component from resistor 578 at node 642. The input of the compensator 576, in effect, forms a summing junction wherein the position error, velocity error and the other input to the summing junction is derrived from the current in the motor measured through shunt 596. That provides a demand current to the system. Because the shunt is placed below the transistor switch 592, motor current can only be measured when current is actually flowing in the motor. To generate a pseudo motor current signal, a simple sample and hold circuit shown generally at 694 is provided which monitors the actual motor current during on times and synthesizes what the motor current would look like if it were in the motor, i.e. the decay in the motor during the time that the transistor 592 is off. This is accomplished by feeding the signal through diode 622 into what essentially is a low pass filter. The resulting signal output to node 642 is a synthesized motor current which provides an acceleration term to the positive input of comparator 586. Comparator 586 thereby compares demanded with actual current during the time the motor is on. Whenever the demand exceeds the actual on-time current FET 592 remains conductive. If the demand ever is less than the actual on-time current, op amp 586 will go low and that signal is used to reset flip-flop 30.

The second comparator 614 provides a maximum absolute current demand which, in the preferred embodiment is set at approximately 10 amps. This prevents peak current from ever exceeding 10 amps. If it ever does, comparator 614 arbitrarily overrides the system via inverter 590 and flip-flop 30 and shuts it off until it is turned on in the next clock pulse. Also, a high data line signal must be maintained on the data input of flip-flop 30 received from microprocessor 186 via terminal 276. The clock input from the microprocessor via terminal AB to flip-flop 30 operates to clock through whatever is on the data line and put it on the Q line. Accordingly, when the D line is high and the clock comes through which it does at a 15 kHz rate, it will always put the level on the D out on the Q. When the clock is not there (subject to being reset at any time) the Q line is prevented from going high. When the Q goes high, the transistor is turned on by the Q line via inverter 594 and the gate of transistor 592 and allows current to flow through the motor. Just prior to the time the transistor is turned on, the shunt resistor does not see any current flowing through it, and therefore no current was sensed by the amplifier 604 and the comparator 586 finds the current demand from amplifier 576 exceeds the measured current so reset of flip-flop 30 is released to accept the clocking in of a new command. The D flip-flop, in the next rising edge of the clock will clock in the enable signal from the microprocessor which is connected to its watch dog line as described above and turn on the FET 592.

Once op amp/comparator 586 has made a decision to shut FET 592 off, motor current will go to zero thereby causing the reset to be removed. Assuming the current comparator is in the high state and flip-flop 30 is initially set, enabling transistor 592, this last failsafe works as follows. The motor current will eventually rise past the demand level set on the positive line of comparator 586 and cause this comparator to change to a low state. This low level will reset flip-flop 30 and, thus, turn transistor 592 off. The absence of current in resistor 596 and op amp 604 will cause comparator 586 output to change back to a high state and remove this reset from flip-flop 30. However, the flip-flop cannot turn back on until the next clock signal is received. It therefore waits some period of time up to 1/15 kHz in time before it gets another rising edge of the clock signal to make the decision to turn back on. The decision is based on the pesence of an enable from the microprocessor at flip-flop 30 data input.

The present design has the advantage of a fixed moderate frequency drive which does not require dissipation of excess power in the FET while permitting the use of relatively inexpensive components. The circuit results in two levels of system failsafe whereby if either the pwm signal or the average value signal is lost it shuts down, meaning that the microprocessor will go through reset and the drive automatically shuts down.

Control circuit 12 contains one more level of failsafe on the D flip-flop in that the drive inhibit line is controlled by the microprocessor and must be high to enable operation of flip-flop 30.

It is to be understood that the invention has been described with reference to a specific embodiment and variations to provide the features and advantages previously described and that such embodiment is susceptible of modification as will be apparent to those skilled in the art. Accordingly, the foregoing is not to be construed in a limiting sense.

What is claimed is:

1. A control circuit for selectively energizing a load, said circuit comprising:
   means operative to receive a pwm demand signal and to generate an input signal as a time averaged function thereof;
   first comparator means operative to generate an error signal as a function of the difference between said input signal and a sensed load condition signal;
   second comparator means operative to generate a switch logic signal as a function of the difference between said error signal and sensed load current;
   switch means operative to selectively energize said load in response to a switch command signal; and
   gating means operative to output said switch command signal in response to receiving both said pwm and switch logic signals.

2. The circuit of claim 1, wherein said load comprises an electromechanical device including an element displaceable in response to said demand signal as a function of said sensed load current.

3. The circuit of claim 2, wherein said load condition signal comprises an element position signal.

4. A clocked current control for a motor operatively engaging a load element, said clocked control comprising:
   means operative to receive a pwm position demand signal and to generate an input position demand signal as a time averaged function thereof;
   first comparator means operative to generate a position error signal as a function of the difference between said input demand signal and a sensed load element position signal;
   second comparator means operative to generate a switch logic signal as a function of the difference between said position error signal and sensed motor current;
   switch means operative to selectively energize said motor in response to a switch command signal; and
   gating means operative to output said switch command signal in response to receiving both said pwm demand and switch logic signals.

5. The current control of claim 4, wherein said gating means comprises a flip-flop circuit, said pwm position demand signal comprises a clock input to said flip-flop circuit and said switch logic signal comprises a reset input to said flip-flop circuit.

6. The current control of claim 4, further comprising circuit means operative to generate a motor acceleration signal as a function of sensed motor current, and wherein said second comparator means generates said switch logic signal as a function of the difference between said sensed motor current and the sum of said error signal and motor acceleration signal.

7. The current control of claim 4, further comprising a microprocessor operative to receive selective parametric inputs, including operator demand, and to output said pwm position demand signal as a function thereof.

8. The current control of claim 4, wherein said current control further comprises means operative to generate a signal operative to disable said gating means whenever said microprocessor is in reset.

9. The current control of claim 8, wherein said gating means comprises a flip-flop circuit and said disable signal comprises a data input to said flip-flop circuit.

10. The current control of claim 4, further comprising circuit means operative to generate an error velocity signal as a function of the time rate of change of said error signal and wherein said second comparator means generates said switch logic signal as a function of the difference between said sensed motor current and the sum of the said error signal and error velocity signal.

11. The current control of claim 10, further comprising circuit means operative to generate a motor acceleration signal as a function of sensed motor current, and wherein said second comparator means generates said switch logic signal as a function of the difference between said sensed motor current and the sum of said error signal, error velocity signal and motor acceleration signal.

12. The current control of claim 4, further comprising third comparator means operative to generate a switch logic override signal whenever sensed motor current exceeds a set limit, said switch logic override signal disabling said gating means from outputting said switch command signals.

13. The current control of claim 4, further comprising forth comparator means operative to generate a logic reset signal whenever both said switch command signal and sensed motor current exceeds a set limit.

14. The current control of claim 13, further comprising a microprocessor operative to receive selective parametric inputs, including operator demand, and to output said pwm position demand signal as a function thereof, wherein said logic reset signal is operative to reset said microprocessor.

15. A throttle control device for an internal combustion engine comprising:
   means defining an air intake passage;
   a valving element disposed for rotational displacement about an axis within said intake passage to effect modulation of charge air flowing therethrough;
   a throttle valve driving motor including a housing assembly fixed with respect to said intake passage defining means and an output shaft operatively engaging said valve element for rotation therewith; and
   a control circuit operative to selectively energize said motor to effect said flow modulation, said circuit including
   means operative to receive a pwm position demand signal and to generate an input position demand signal as a time averaged function thereof,
   first comparator means operative to generate a position error signal as a function of the difference between said input demand signal and a sensed valving element position signal,
   second comparator means operative to generate a switch logic signal as a function of the difference between said position error signal and sensed motor current, switch means operative to selectively energize said motor in response to a switch command signal, and gating means operative to output said switch command signal in response to receiving both said pwm demand and switch logic signals.

16. The throttle control device of claim 15, wherein said throttle valve driving motor comprises a reluctance torque motor.

* * * * *